(12) United States Patent
Suzuki et al.

(10) Patent No.: US 6,345,542 B1
(45) Date of Patent: Feb. 12, 2002

(54) RUNNING RESISTANCE CONTROL APPARATUS OF CHASSIS DYNAMOMETER

(75) Inventors: Masahiko Suzuki, Shizuoka; Toshimitsu Maruki, Gunma, both of (JP)

(73) Assignee: Kabushiki Kaisha Meidensha, Tokyo (JP)

( * ) Notice: Subject to any disclaimer, the term of this patent is extended or adjusted under 35 U.S.C. 154(b) by 0 days.

(21) Appl. No.: 09/102,215

(22) Filed: Jun. 22, 1998

(30) Foreign Application Priority Data

Jun. 23, 1997 (JP) .............................................. 9-165453

(51) Int. Cl.[7] .................................................. G01L 3/16

(52) U.S. Cl. ................................................... 73/862.09

(58) Field of Search ........................ 73/862.18, 862.09, 73/117, 862.17; 364/426.041; 701/53

(56) References Cited

U.S. PATENT DOCUMENTS

| | | | | |
|---|---|---|---|---|
| 5,542,290 A | * | 8/1996 | Suzuki | 73/117 |
| 5,623,104 A | * | 4/1997 | Suga | 73/862.18 |
| 5,625,558 A | * | 4/1997 | Togai et al. | 364/426.041 |
| 6,029,107 A | * | 2/2000 | Sato et al. | 701/58 |

* cited by examiner

Primary Examiner—Benjamin R. Fuller
Assistant Examiner—Jewel V. Thompson
(74) Attorney, Agent, or Firm—Foley & Lardner

(57) ABSTRACT

A running resistance control apparatus of a chassis dynamometer comprises a target vehicle speed calculating section where a target vehicle speed is calculated on the basis of a control torque of a dynamometer, a running resistance torque, a mechanical loss torque, a detected vehicle speed, a vehicle weight and a mechanical weight of roller and a dynamometer. An electric inertia torque is compensated according to a difference between the detected vehicle speed and a target vehicle speed to adjust the detected vehicle speed at the target vehicle speed.

5 Claims, 4 Drawing Sheets

RUNNING RESISTANCE CONTROL APPARATUS OF CHASSIS DYNAMOMETER

BACKGROUND OF THE INVENTION

The present invention relates to a running resistance control apparatus for a chassis dynamometer.

Generally, a chassis dynamometer is arranged to execute a drive simulation of a test vehicle so as to measure various characteristics such as exhaust gas characteristic and fuel consumption. Such a simulation is executed in a manner such as to set the test vehicle on the chassis dynamometer and to drive the test vehicle under a predetermined road running pattern while executing a running resistance control. In order to adapt the chassis dynamometer to various vehicles having various weights, the conventional chassis dynamometer employs an electric inertial control which electrically simulates various weights of test vehicles.

As shown in FIG. 2, a conventional chassis dynamometer comprises a roller 1 which is rotatably supported to a base and on which driving wheels of a test vehicle 2 are set. A dynamometer 3 is interconnected with the roller 1 and is arranged to absorb a rotational power of the roller 1 rotated by the driving of the test vehicle 2. A load cell 4 detects an absorption torque of the dynamometer 3. A scale-up section 5 scales up an output of the load cell 4 from a millivolt (mV) unit to a volt (V) unit. A pulse pickup 6 detects a rotation speed of the dynamometer 3 which speed corresponds to a vehicle speed of the test vehicle 2. An output pulse indicative of the vehicle speed 2 is outputted from the pulse pickup 6 to a frequency modulating section 7 (frequency modulator) where the output pulse is converted into a corresponding voltage value.

A running resistance setting section 8 connected to the frequency modulating section 7 outputs a running resistance torque $R_{RL}$ corresponding to the input voltage on the basis of a predetermined relationship between the vehicle speed and a running resistance torque. A mechanical-loss setting section 9 receives the vehicle-speed indicative voltage and outputs a mechanical-loss torque $F_{ML}$ corresponding to the vehicle speed on the basis of the predetermined relationship between the vehicle speed and the mechanical-loss torque. An electric inertia setting section 10 is constituted by a differential calculating section 11 and an electric inertia calculating section 12. The differential calculating section 11 obtains an acceleration speed dv/dt of the vehicle 2 by differentiating the output of the frequency modulating section 7. The electric inertia calculating section 12 calculates an electric inertia torque $F_E=(W_{car}-W_o)dv/dt$ from an output of an inertia setting section 13 for setting an weight $W_{car}$ of the vehicle 2 and the output of the differential calculating section 11 wherein $W_o$ is a mechanical inertia of the roller 1 and the dynamometer 3 which is previously stored.

An adding and subtracting section 14 adds the electric inertia torque $F_E$ to the running resistance torque $F_{RL}$ and subtracts the mechanical loss torque $T_{ML}$ from the sum of the electric inertia torque $F_E$ and the running resistance torque $F_{RL}$. A difference detecting section 15 detects a difference between a torque command value which is an output of the adding and subtracting section 14 and a detection torque which is an output of the scale-up section 5. A torque control section 16 is constituted by an amplifying section 17 for amplifying the output of the difference detecting section 15, a phase control section 18 for outputting a phase control signal according to the output of the amplifying section 17 and a rectifier 19 which is turned on and off according to the phase control signal. The torque control section 16 controls an AC electric source by means of the Lenard control or inverter control and supplies the controlled voltage to the dynamometer 3.

FIG. 3 shows a conventional running resistance control apparatus wherein the running resistance setting section 8 sets the running resistance torque $F_{RL}$ according to the detected vehicle speed V of the test vehicle 2 and outputs it. The mechanical loss setting section 9 sets the mechanical loss $F_{ML}$ according to the detected vehicle speed V and outputs it. The differential calculating section 11 obtains the acceleration speed of the vehicle 2 by differentiating the detected vehicle speed V. The electric inertia calculating section 12 calculates the electric inertia torque $F_E$ from the output of the differential calculating section 11, the vehicle weight $W_{car}$ and the mechanical inertia $W_o$ of the roller 1 and the dynamometer 3 by using the equation $F_E=(W_{car}-W_o)dv/dt$. The adding and subtracting section 14 adds the running resistance torque $F_{RL}$ and the electric inertia torque $F_E$ and subtracts the mechanical loss torque $F_{ML}$ therefrom. The output of the adding and subtracting section 14 is inputted to a dynamometer torque control section 20. The dynamometer torque control section 20 obtains the dynamometer control torque $F_{LC}$ and inputs it to an adding and subtracting section 24. A chassis dynamometer 21 comprises a roller 1 and the dynamometer 3 and is represented by a fixed inertia section 22 constituted by an integral element of the mechanical inertia $W_o$ and a mechanical loss section 23 and the adding and subtracting section 24. The adding and subtracting section 24 subtracts the dynamometer control torque $F_{LC}$ and the output of the mechanical loss section 23 from a drive torque $F_{car}$ corresponding to the vehicle weight $W_{car}$.

However, the conventional running resistance control apparatus of a chassis dynamometer produces a control delay time of about 100 milliseconds during the electric inertia control. Therefore, the detected vehicle speed V generates a control error with respect to a target vehicle speed $V_R$ obtained under an ideal running condition of the vehicle 2. As shown in FIG. 4, a continuous line shows a target vehicle speed $V_R$ which is obtained in case that the vehicle 2 ideally runs receiving the set running resistance. A dotted line shows the detected vehicle speed V affected by the delay of the electric inertia control. The relationship between the target vehicle speed $V_R$ and the detected vehicle speed V shown in FIG. 4 is established when the set vehicle weight $W_{car}$ is greater than the fixed inertia. When the set vehicle weight $W_{car}$ is smaller than the fixed inertia, the acceleration and the deceleration of the vehicle speed inversely function as compared with the case that the set vehicle weight is greater than the fixed inertia. Due to the delay of the electric inertia control, the detection vehicle speed V during the acceleration and the deceleration generates the error with respect to the target vehicle speed. This error badly affects the result of the exhaust gas performance and the fuel consumption as compared with those in case that the vehicle 2 actually runs on a road.

SUMMARY OF THE INVENTION

It is an object of the present invention to provide an improved running resistance control apparatus of a chassis dynamometer which apparatus improves the responsibility of an electric inertia control and corresponds a vehicle speed during acceleration and deceleration to a target vehicle speed so as not to affect the fuel consumption and exhaust gas performance.

A running resistance control apparatus according to the present invention is for a chassis dynamometer which comprises a roller on which a test vehicle is set and a dynamometer connected to the roller. The running resistance control apparatus comprises a running resistance setting section which sets a running resistance torque of the test vehicle according to the detected vehicle speed of the test vehicle. A mechanical loss setting section sets a mechanical loss torque according to the detected vehicle speed of the test vehicle. A differential calculating section differentiates the detected vehicle speed of the test vehicle. An electric inertia calculating section calculates an electric inertia torque from the output of the differential calculating section, a weight of the test vehicle and a preset mechanical inertia of the roller and the dynamometer. A target vehicle speed calculating section calculates a target vehicle speed from the detected vehicle speed, a control torque of the dynamometer, the running resistance torque and the mechanical loss torque. A speed amplifying section amplifies a difference between an output of the target vehicle speed calculating section and the detected vehicle speed. A subtracting section subtracts an output of the speed amplifying section from an output of the electric inertia calculating section. An adding and subtracting section adds the output of the running resistance setting section and the output of the subtracting section and subtracts the output of the mechanical loss setting section therefrom. A torque control section controls the control torque of the dynamometer according to the output of the adding and subtracting section.

BRIEF DESCRIPTION OF DRAWINGS

In the drawings, like reference numerals designate like parts and elements throughout all figures, in which.

DETAILED DESCRIPTION OF THE INVENTION

Figure 1:
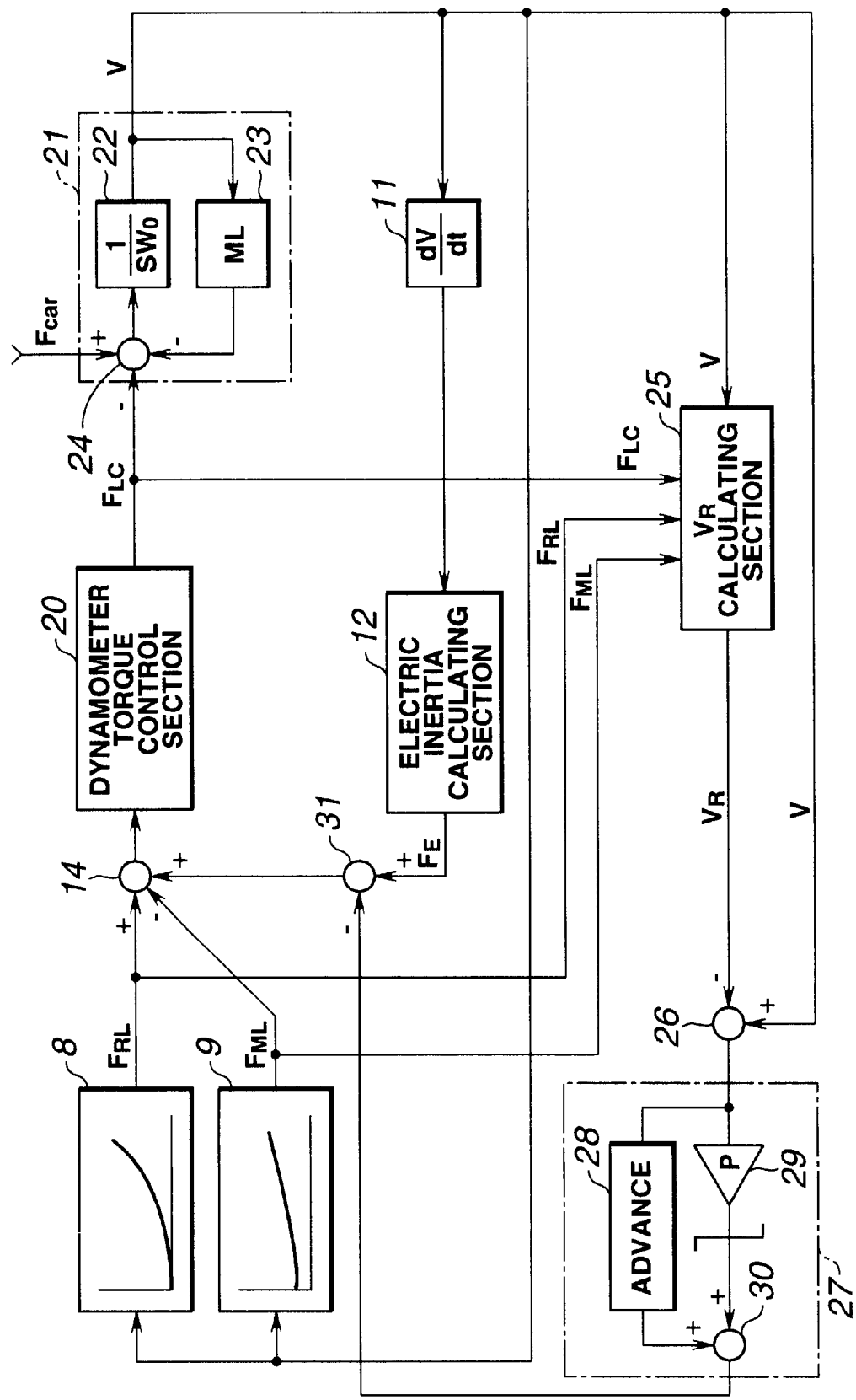
FIG. 1 is a block diagram showing a running resistance control apparatus of a chassis dynamometer according to the present invention.
Figure 2:
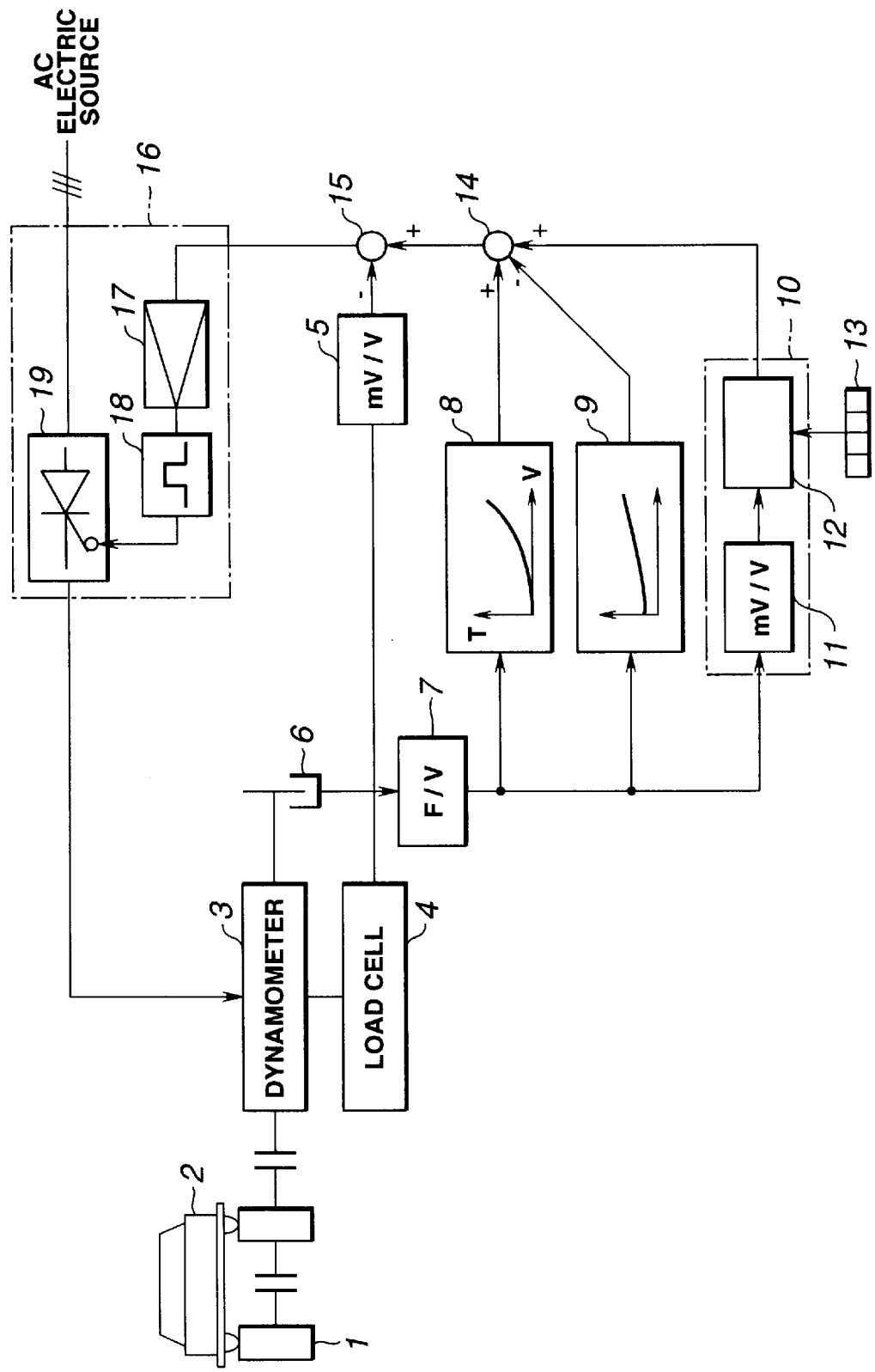
FIG. 2 is a block diagram showing a chassis dynamometer including a conventional running resistance control apparatus.

Referring to FIG. 1, there is shown an embodiment of a running resistance control apparatus for a chassis dynamometer in accordance with the present invention. The running resistance control apparatus according to the present invention is applied to the conventional chassis dynamometer shown in FIG. 2, instead of the conventional running resistance control apparatus.

Figure 3:
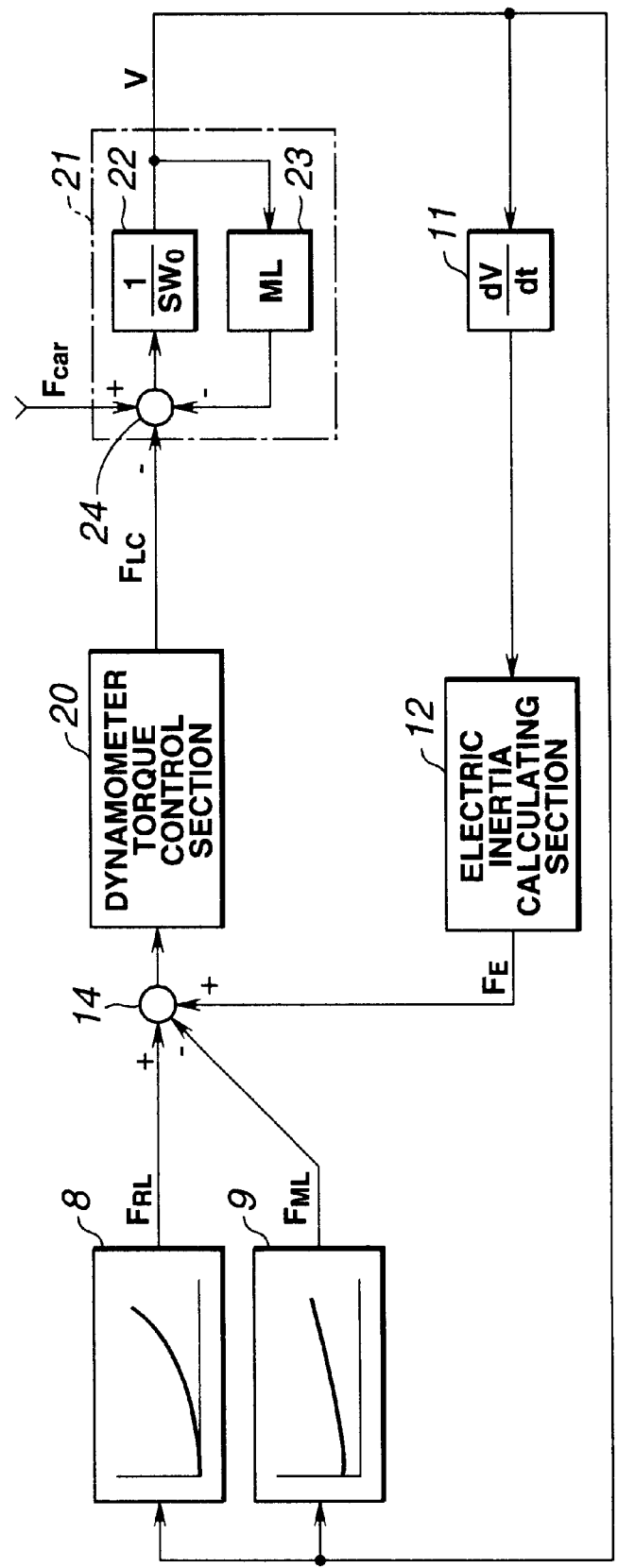
FIG. 3 is a block diagram showing the conventional running resistance control apparatus.
Figure 4:
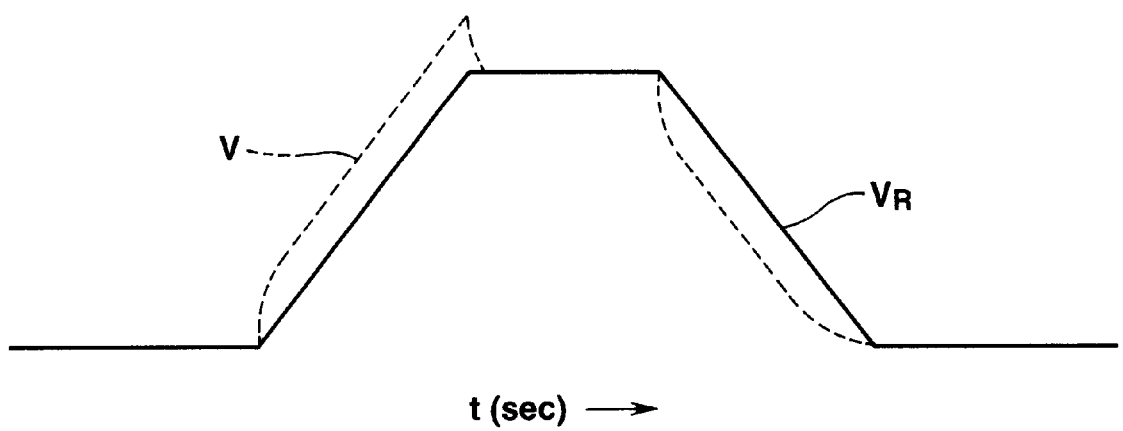
FIG. 4 is a graph for explaining a control error of the conventional running resistance control apparatus.

As shown in FIG. 1, the running resistance control apparatus according to the present invention comprises a target vehicle speed calculating section 25, a difference detecting section 26, a speed amplifying section 27 and a subtracting section 31, in addition to elements constituting a conventional running resistance control apparatus shown in FIG. 3, such as the sections 8, 9, 11, 12, 21, 22, 23 and 24. The target vehicle speed calculating section 25 receives the control torque $F_{LC}$ outputted from a dynamometer torque control section 20, the running resistance torque $F_{RL}$ outputted from the running resistance setting section 8, the mechanical loss torque $F_{ML}$ outputted from the mechanical loss setting section 9, and the detected vehicle speed V outputted from the chassis dynamometer 21. The target vehicle speed calculating section 25 calculates a target vehicle speed $V_R$ on the basis of the received inputs from the following equations (3) which is derived from the equations (1) and (2).

$$F_{car} = F_{RL} + W_{car}\frac{dV_R}{dt} \qquad (1)$$

$$F'_{car} = F_{LC} + F_{ML} + W_o\frac{dv}{dt} \qquad (2)$$

where $F_{car}$ is a drive torque of the test vehicle 2 on a road, and $F'_{car}$ is a drive torque of the test vehicle 2 on the chassis dynamometer 21.

It is assumed that the equation (1) is equal to the equation (2), the following equation (3) is obtained.

$$V_R = \frac{1}{W_{car}}\left(\int F_E dt + W_o V\right) \qquad (3)$$

where $F_E = F_{LC} + F_{ML} - F_{RL}$.

The target vehicle speed calculating section 25 calculates the target vehicle speed $V_R$ in the above-mentioned manner and outputs the calculated target vehicle speed $V_R$ to the difference detecting section 26. The difference detecting section 26 receives the target vehicle speed $V_R$ and the vehicle speed V and obtains a difference by subtracting the target vehicle speed $V_R$ from the vehicle speed V. The difference obtained at the difference detecting section 26 is inputted to the speed amplifying section 27. The speed amplifying section 27 comprises a differential calculating section 28 for differentiating the difference, a limited proportion calculating section 29 for calculating a linearly amplified value of the difference and an adding section 30 for adding the output of the differential calculating section 28 and the output of the limited proportion calculating section 29. The output of the speed amplifying section 27 is inputted to the subtracting section 31. The subtracting section 31 receives the output of the speed amplifying section 27 and the electric inertial torque $F_E$ outputted from the electric inertia calculating section 12 and subtracts the output of the speed amplifying section 27 from the electric inertia torque $F_E$. The output of the subtracting section 31 is inputted to the adding and subtracting section 14 wherein the output of the subtracting section 31 and the running resistance torque $F_{RL}$ is added and the mechanical loss torque $F_{ML}$ is subtracted therefrom. The dynamometer torque control section 20 executes the torque control of the dynamometer 3 according to the output of the adding and subtracting section 14.

With the thus arranged embodiment according to the present invention, since the speed control loop for compensating the electric inertia torque $F_E$ according to the difference between the detected vehicle speed V and the target vehicle speed $V_R$, it is possible to correspond the detected vehicle speed V to the target vehicle speed $V_R$ by this compensation. Therefore, the fuel consumption and the exhaust gas performance become free from the affection of delay of the electric inertia control. Further, since the vehicle speed signal is stable as compared with the acceleration speed signal obtained by the differential calculation, it is possible to execute the gain-up of the speed control loop. This gain-up decreases the control delay of the electric inertia control to half. Furthermore, since the running resistance control apparatus according to the present invention is arranged to execute the proportion and differential (advance) calculation at the speed amplifying section 27, the responsibility thereof is further improved.

The entire disclosure of Japanese Patent Application No. 9-165453 filed on Jun. 23, 1997 including specification, claims, drawings and summary are incorporated herein by reference in its entirety.

What is claimed is:

1. A running resistance control apparatus of a chassis dynamometer, the chassis dynamometer comprising a roller on which a test vehicle is set and a dynamometer connected to the roller, the running resistance control apparatus comprising:

a running resistance setting section setting a running resistance torque of the test vehicle according to a vehicle speed of the test vehicle;

a mechanical loss setting section setting a mechanical loss torque according to the vehicle speed of the test vehicle;

a differential calculating section differentiating the vehicle speed of the test vehicle;

an electric inertia calculating section calculating an electric inertia torque from an output of said differential calculating section, a weight of the test vehicle and a preset mechanical inertia of the roller and the dynamometer;

a target vehicle speed calculating section calculating a target vehicle speed from the vehicle speed, a control torque of the dynamometer, the running resistance torque and the mechanical loss torque;

a speed amplifying section amplifying a difference between an output of said target vehicle speed calculating section and the vehicle speed;

a subtracting section subtracting an output of said speed amplifying section from an output of said electric inertia calculating section;

an adding and subtracting section adding the output of said running resistance setting section and the output of said subtracting section and subtracting the output of said mechanical loss setting section therefrom; and a torque control section controlling the control torque of the dynamometer according to an output of said adding and subtracting section.

2. A running resistance control apparatus as claimed in claim 1, wherein said speed amplifying section comprises a proportion calculating section for obtaining a proportion value of the difference, a differential calculating section for obtaining a differential of the difference and an adding section for adding an output of said proportion calculating section and an output of said differential calculating section.

3. A running resistance control apparatus as claimed in claim 1, wherein said target vehicle speed calculating section calculates the target vehicle speed $V_R$ from the following equation.

$$V_R = \frac{1}{W_{car}} \left( \int F_E dt + W_o V \right)$$

where $F_E = F_{LC} + F_{ML} - F_{RL}$, $F_{LC}$ is a control torque, $F_{ML}$ is a mechanical loss torque, $F_{RL}$ is a running resistance torque, $W_{car}$ is a vehicle weight, $W_O$ is a mechanical inertia of the roller and the dynamometer, and V is the detected vehicle speed.

4. A running resistance control apparatus as claimed in claim 1, wherein said speed amplifying section includes a differential calculating section for differentiating the difference between the detected vehicle speed and the target vehicle speed, a limited proportion calculating section for calculating a linearly amplified value of the difference, and an adding section for adding the output of the differential calculating section and the output of the limited proportion calculating section.

5. A running resistance control apparatus of a chassis dynamometer, the chassis dynamometer comprising a roller on which a test vehicle is set and a dynamometer connected to the roller, the running resistance control apparatus comprising:

a target vehicle speed calculating section for calculating a target vehicle speed on the basis of a control torque of a dynamometer, a running resistance torque, a mechanical loss torque, a vehicle speed, a vehicle weight and a mechanical inertia of roller and a dynamometer; and an electric inertia torque compensating section for compensating an electric inertia torque according to a difference between the vehicle speed and a target vehicle speed so as to adjust the vehicle speed at the target vehicle speed.

\* \* \* \* \*